(12) United States Patent
Huang

(10) Patent No.: US 8,346,321 B2
(45) Date of Patent: Jan. 1, 2013

(54) HANDHELD TYPE ELECTRONIC DEVICE

(75) Inventor: Yu-Chang Huang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 1089 days.

(21) Appl. No.: 12/246,682

(22) Filed: Oct. 7, 2008

(65) Prior Publication Data

US 2009/0284473 A1 Nov. 19, 2009

(30) Foreign Application Priority Data

May 15, 2008 (TW) ................. 97208466 U

(51) Int. Cl.
*H04M 1/00* (2006.01)

(52) U.S. Cl. ..................................... 455/575.4

(58) Field of Classification Search ............... 455/575.3, 455/575.4, 575.1, 575.2, 575.9; 340/572.8, 340/693.5, 693.12, 391.1, 396.1
See application file for complete search history.

(56) References Cited

U.S. PATENT DOCUMENTS

| | | | | |
|---|---|---|---|---|
| 4,960,256 A | * | 10/1990 | Chihara et al. | 248/286.1 |
| 5,481,430 A | * | 1/1996 | Miyagawa et al. | 361/679.09 |
| 6,151,486 A | * | 11/2000 | Holshouser et al. | 455/575.3 |
| 6,633,347 B2 | * | 10/2003 | Kitazawa | 348/837 |
| 7,578,243 B2 | * | 8/2009 | Gevaert | 108/25 |
| 2008/0231156 A1 | * | 9/2008 | Hoshide et al. | 312/334.46 |

* cited by examiner

*Primary Examiner* — Marcos Torres
*Assistant Examiner* — Hung Du
(74) *Attorney, Agent, or Firm* — Tutunjian & Bitetto, P.C.

(57) ABSTRACT

A handheld type electronic device includes a main device body, a screen body, and first and second limiting mechanisms provided between the main device body and the screen body. The main device body includes a depression. The screen body is provided between left and right inner walls of the depression. The first limiting mechanism includes a pair of first protrusions and a pair of second recesses. The first protrusions extend resiliently and respectively into the first recesses to limit the screen body at a flipped-up state. The second limiting mechanism includes at least one second protrusion, and a second recess. The second protrusion is disposed to extend into the second recess to limit the screen body at a folded state. The second protrusion is subjectable to a force to withdraw from the second recess to enable the screen body to be flipped upward relative to the depression.

5 Claims, 5 Drawing Sheets

HANDHELD TYPE ELECTRONIC DEVICE

CROSS-REFERENCE TO RELATED APPLICATION

This application claims priority of Taiwanese Application No. 097208466, filed on May 15, 2008.

BACKGROUND OF THE INVENTION

1. Field of the Invention

The invention relates to a handheld type electronic device, more particularly to a handheld type electronic device with a screen that can be flipped up.

2. Description of the Related Art

Referring to FIGS. 1 and 2, a handheld type electronic device 1 disclosed in Taiwanese Publication No. 263698 includes a main device body 11 and a screen body 12. The main device body 11 has a top face provided with a key or button set 111. The screen body 12 has a top face provided with a display screen 121. Slide grooves 112 and projecting axles 122 are correspondingly provided between the main device body 11 and the screen body 12, whereby the screen body 12 is switchable between a first state, where the screen body 12 overlaps the main device body 11 to conceal the button set 111, and a second state, where the screen body 12 is slid out relative to the main device body 11 to expose the button set 111. When the screen body 12 is slid out relative to the main device body 11, the screen body 12 is pivotable upwardly relative to the main device body 11 to adjust the angle of the display screen 121 so as to facilitate viewing of the display screen 121.

One drawback of the aforementioned handheld type electronic device 1 is that, when the screen body 12 is pivoted upwardly relative to the main device body 11 to adjust the viewing angle, since there is no other positioning mechanism between the screen body 12 and the main device body 11, the screen body 12 is likely to flip down back to a flat position due to its weight, so that stability is rather inadequate.

SUMMARY OF THE INVENTION

Therefore, an object of the present invention is to provide a handheld type electronic device with a screen that has positioning functionality when pivotally turned to a flipped-up position so as to enhance stability.

Accordingly, the handheld type electronic device of this invention includes a main device body, a screen body, a first limiting mechanism, and a second limiting mechanism. The main device body includes a top face and a depression that is recessed from the top face. The depression has left and right inner walls.

The screen body includes left and right outer walls, is provided between the left and right inner walls of the depression, and is switchable between a folded state, where the screen body is accommodated in the depression, and a flipped-up state, where the screen body is flipped upward relative to the depression.

The first limiting mechanism includes a pair of first protrusions and a pair of first recesses. One of the pair of first protrusions and the pair of first recesses is provided on and proximate to front ends of the left and right inner walls of the depression. The other of the pair of first protrusions and the pair of first recesses is provided on and proximate to front ends of the left and right outer walls. The first protrusions are disposed to extend resiliently and respectively into the first recesses such that the screen body is limited at the flipped-up state.

The second limiting mechanism includes at least one second protrusion and a second recess corresponding to the second protrusion. One of the second protrusion and the second recess is provided on one of the left and right inner walls of the depression. The other of the second protrusion and the second recess is provided on a corresponding one of the left and right outer walls of the screen body. The second protrusion is disposed to extend into the second recess such that the screen body is limited at the folded state. The second protrusion is subjectable to a force to be withdrawn from the second recess so as to enable the screen body to be flipped up relative to the depression.

According to a preferred embodiment of this invention, the first protrusions project resiliently and respectively from the left and right outer walls of the screen body, and the first recesses are provided respectively in the left and right inner walls of the depression.

According to a preferred embodiment of this invention, the first limiting mechanism further includes a pair of third recesses provided respectively in the left and right inner walls. The first recess in each of the left and right inner walls is spaced apart from a corresponding one of the third recesses. When the first protrusions extend respectively into the third recesses, the screen body is limited at the folded state.

According to a preferred embodiment of this invention, the screen body further includes a plurality of resilient members and two connecting bodies. Each of the connecting bodies is connected to the first protrusion and the second protrusion on a same one of the left and right outer walls of the screen body. The resilient members are provided within the screen body for enabling the first protrusions and the second protrusions to project resiliently from the left and right outer walls of the screen body.

According to a preferred embodiment of this invention, the outer walls of the screen body and the inner walls of the depression are interconnected slidably by virtue of the arrangement of guide slots and sliding axles.

The present invention utilizes the limiting function provided by the limiting mechanisms between the main device body and the screen body to enable the screen body to have a positioning function when adjusted and pivoted to a flipped-up state, thereby maintaining the stability of the screen body in the flipped-up state.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
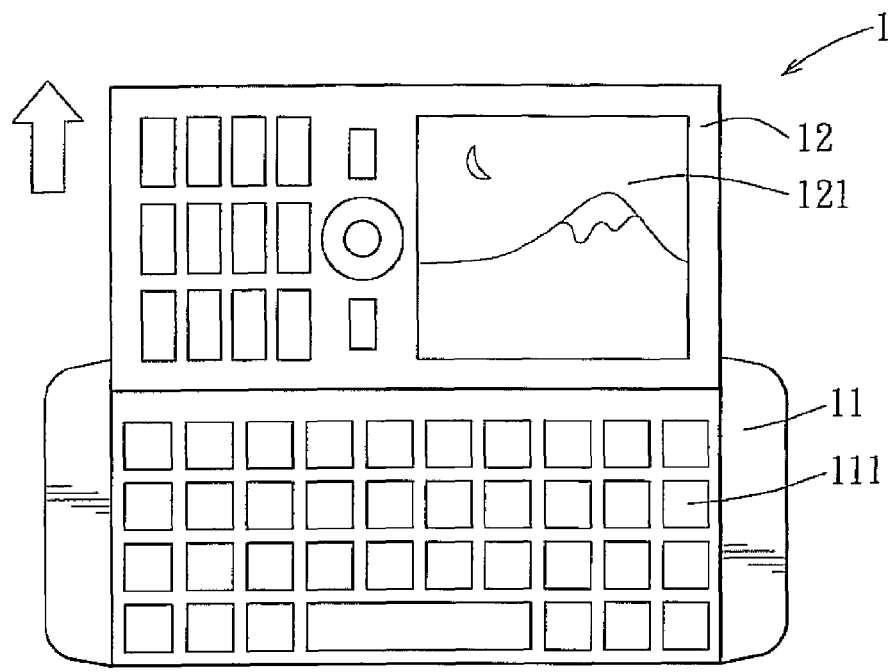
FIG. 1 is a schematic view to illustrate a handheld type electronic device disclosed in Taiwanese Publication No. 263698, in which a screen body is pushed away relative to a main device body.
Figure 2:
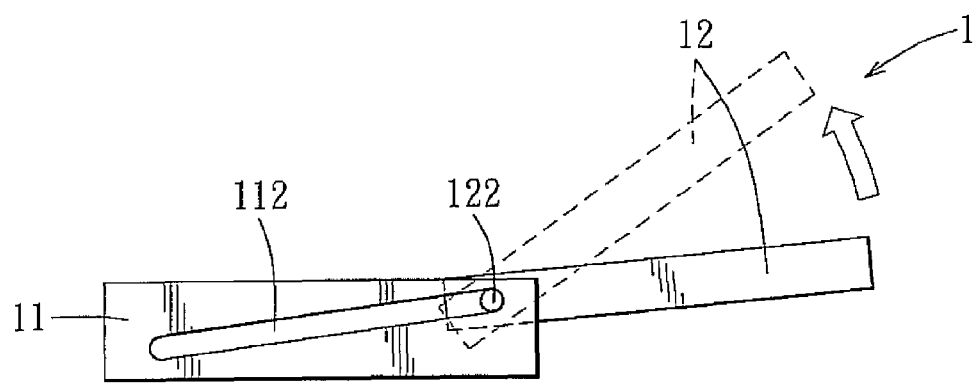
FIG. 2 is a side view of the handheld electronic device of FIG. 1, illustrating that the screen body is pushed away relative to the main device body.
Figure 3:
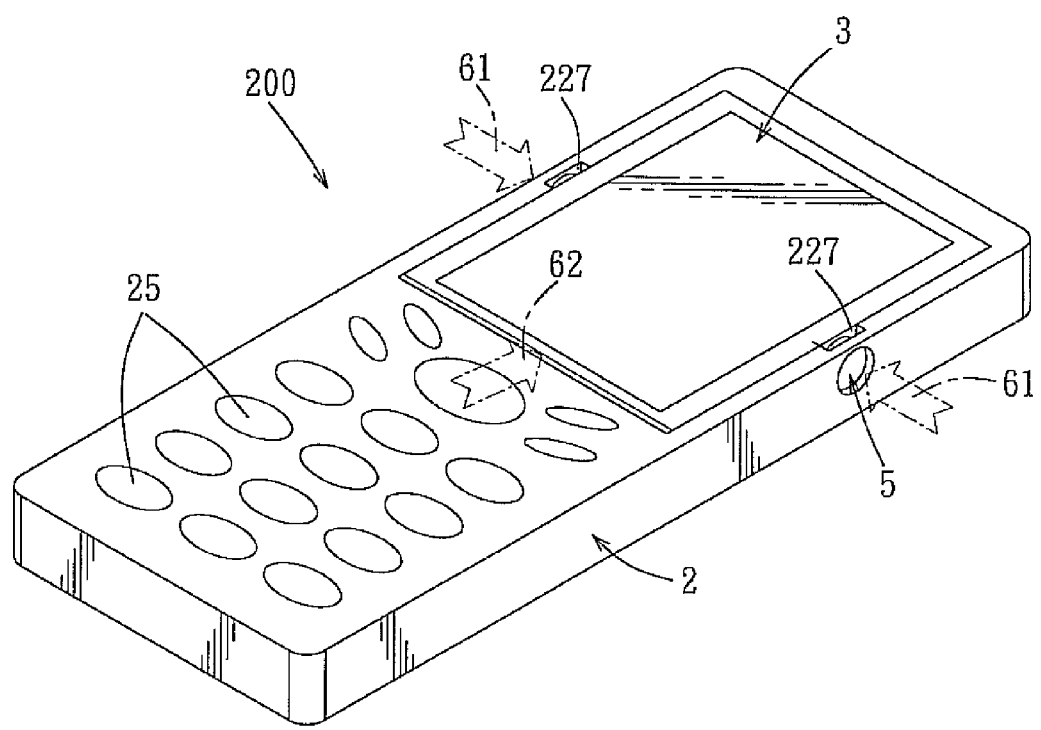
FIG. 3 is a perspective view to illustrate a preferred embodiment of a handheld type electronic device according to the present invention.
Figure 4:
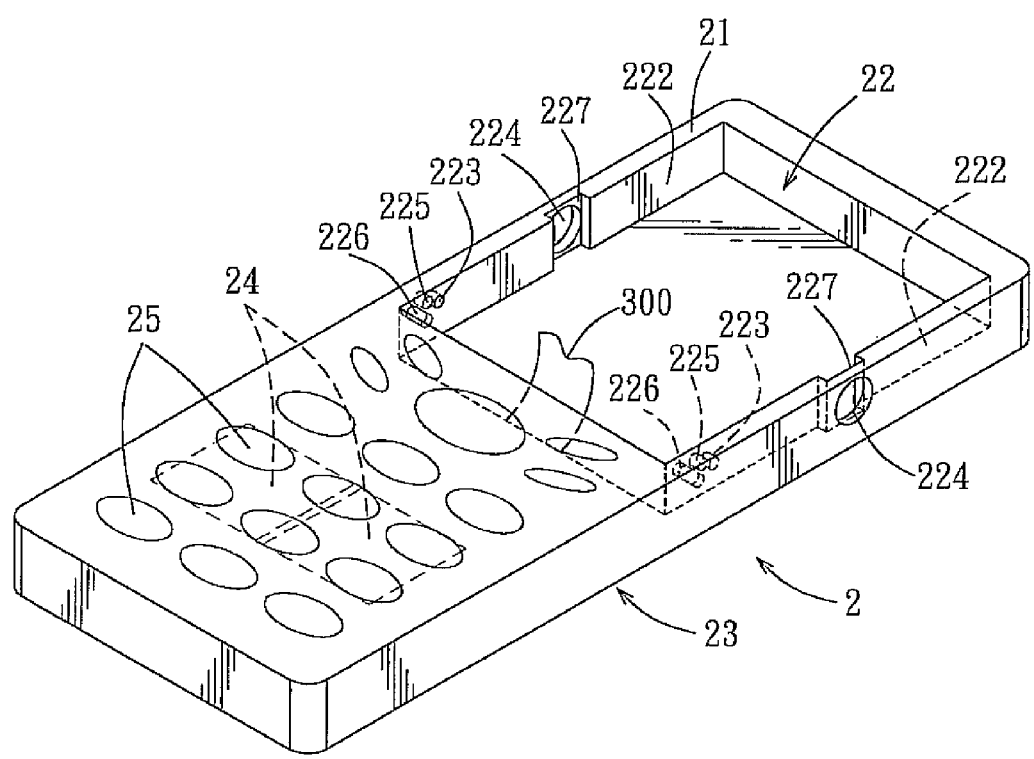
FIG. 4 is a perspective view of a main device body of the preferred embodiment.
Figure 5:
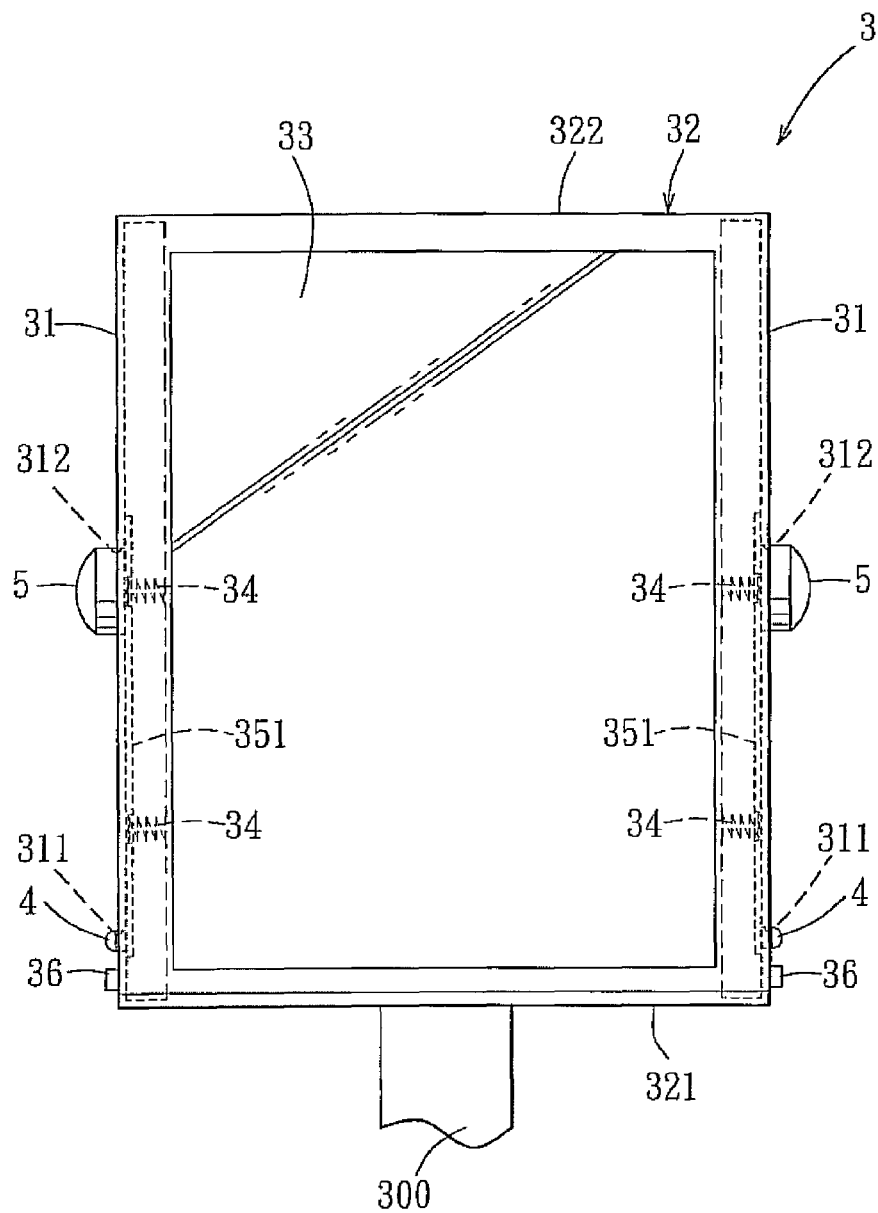
FIG. 5 is a top view of a screen body of the preferred embodiment.

Referring to FIGS. 3 to 5, the preferred embodiment of a handheld type electronic device 200 according to this invention is embodied in a cell phone, but may actually be any other handheld type electronic device such as a personal digital assistant (PDA), a smart phone, etc. In this embodiment, the handheld type electronic device 200 includes a main device body 2, a screen body 3, a first limiting mechanism, and a second limiting mechanism.

The main device body 2 includes a main device casing 23, a plurality of electronic components 24 disposed in the main device casing 23, and a plurality of keys or buttons 25. The main device casing 23 has a top face 21 and a depression 22 that is recessed from the top face 21. The buttons 25 are provided on the main device casing 23, and are exposed from the top face 21. In terms of orientation, the buttons 25 are located in front of the depression 22. The depression 22 has left and right inner walls 222. Each of the left and right inner walls 222 is provided with a guide slot 226 proximate to a front end thereof.

The screen body 3 includes a screen casing 32, a display panel 33 disposed within the screen casing 32 and connected electrically (through ribbon wires or a flexible circuit board 300) to the electronic components 24 of the main device body 2, and two sliding axles 36. The display panel 33 may be a touch panel or an ordinary display panel. The screen casing 32 has a front edge 321, a rear edge 322, and left and right outer walls 31. Each of the left and right outer walls 31 has a first opening 311 and a second opening 312 spaced apart from each other, the functions of which will be described hereinafter. The two sliding axles 36 respectively project from front ends of the left and right outer walls 31 of the screen casing 32 for extension into the guide slots 226 in the left and right inner walls 222 of the main device casing 23, respectively.

The first limiting mechanism includes a first recess 223 and a third recess 225 provided in and proximate to a front end of each of the left and right inner walls 222 of the main device casing 23, and two first protrusions 4 projecting resiliently and respectively from the left and right outer walls 31 of the screen casing 32. In this embodiment, the first recesses 223 and the third recesses 225 are holes. The first protrusions 4 are respectively proximate to the front ends of the left and right outer walls 31.

The second limiting mechanism includes two second recesses 224 provided respectively in the left and right inner walls 222 of the main device casing 23 and distal from the front ends of the left and right inner walls 222, respectively, and two second protrusions 5 provided respectively on the left and right outer walls 31 of the screen casing 32 and corresponding respectively to the two second recesses 224. In this embodiment, the second recesses 224 are through holes extending through the main device casing 23. Moreover, each of the left and right inner walls 222 of the depression 22 is indented at a suitable position to form an indentation 227. The second recesses 224 are respectively located in the indentations 227 in the left and right inner walls 222.

In addition, in this embodiment, the screen body 3 further includes a plurality of resilient members 34 and two connecting bodies 351. Each of the connecting bodies 351 is provided between one of left and right sides of the display panel 33 and a respective one of the left and right outer walls 31. Each of the connecting bodies 351 is connected to the first and second protrusions 4, 5 on a same one of the left and right outer walls 31 of the screen casing 32. The resilient members 34 in this embodiment are compression springs. Each of the resilient members 34 abuts against and is disposed between a corresponding one of the left and right sides of the display panel 33 and a corresponding one of the connecting bodies 351 such that the first and second protrusions 4, 5 extend resiliently and outwardly of the left and right outer walls 31 through the first and second openings 311, 312, respectively.

Figure 6:
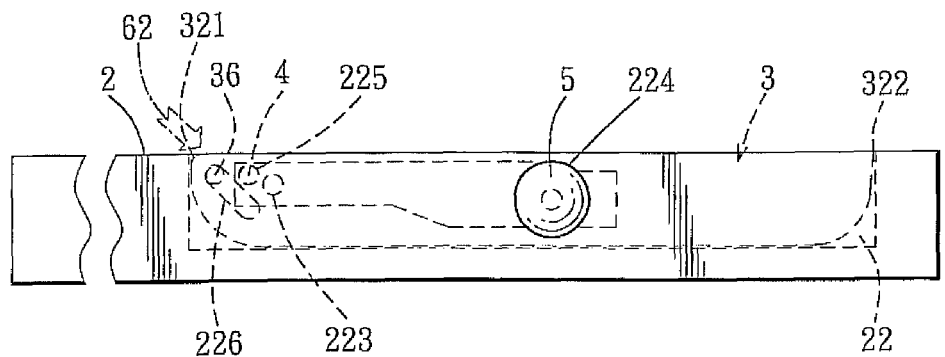
FIG. 6 is a side view to illustrate the screen body of the preferred embodiment in a folded state.
Figure 7:
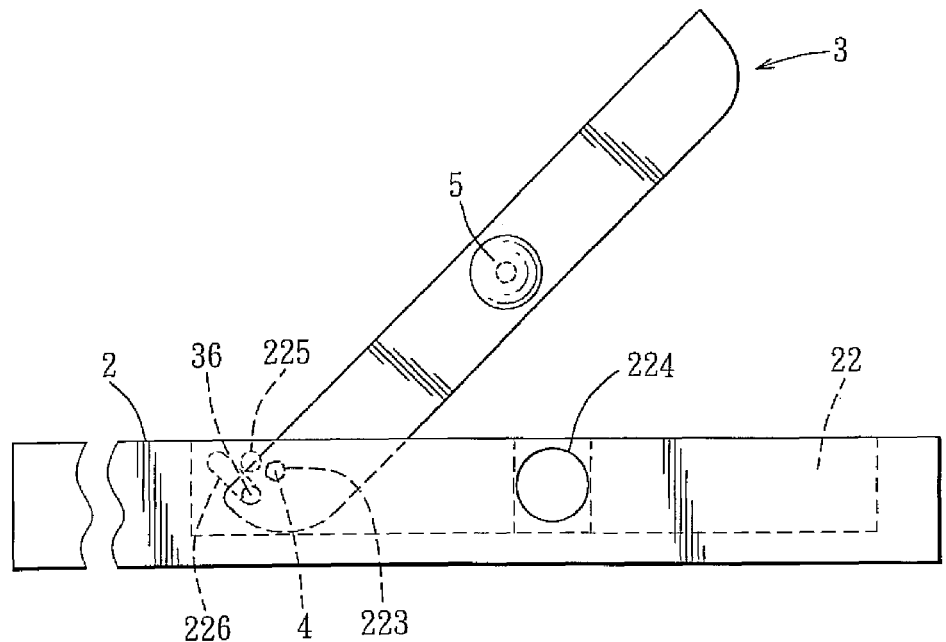
FIG. 7 is a side view to illustrate the screen body of the preferred embodiment in a flipped-up state.

Referring to FIGS. 3, 4, 6 and 7, the screen body 3 has the two sliding axles 36 that extend into the two guide slots 226 in the main device body 2 and is disposed between the left and right inner walls 222 of the depression 22. Thus, the screen body 3 may be switched between a folded state, where it is accommodated in and lies flat within the depression 22 (as shown in FIG. 6), and a flipped-up state, where it is flipped upward relative to the depression 22 (as shown in FIG. 7).

When the screen body 3 is disposed in the folded state, the first protrusions 4 on both sides of the screen body 3 extend respectively into the third recesses 225 in the left and right inner walls 222 of the depression 22, whereas the second protrusions 5 extend respectively into the second recesses 224, thereby limiting the screen body 3 at the folded state.

When the user intends to flip the screen body 3 upward from the folded state to the flipped-up state, the two second protrusions 5 of the screen body 3 at the second recesses 224 on both sides of the main device casing 23 are first pressed (as indicated by arrows 61 in FIG. 3), so that the two second protrusions 5 are withdrawn from the second recesses 224 of the main device casing 23, respectively. Subsequently, the user can use the other hand to push a top face of the screen body 3 that is proximate to the front edge 321 to move the screen body 3 rearwardly (as indicated by the arrow 62 in FIG. 3), 50 that the sliding axles 36 on both sides of the screen body 3 slide downward along the guide slots 226, respectively, and the entire screen body 3 is flipped up relative to the depression 22 until the first protrusions 4 extend respectively into the first recesses 223, thereby limiting the screen body 3 at the flipped-up state.

It is additionally noted that, in this embodiment, the first protrusion 4 and the second protrusion 5 on the same side of the screen body 3 are connected through the corresponding connecting body 351 so as to be movable in association. Thus, when the second protrusions 5 are pressed, the first protrusions 4 will be moved in association therewith to withdraw from the third recesses 225, thereby facilitating flipping of the screen body 3 from the folded state to the flipped-up state by the user. In addition, in this embodiment, since the second recesses 224 are located in the indentations 227 in the left and right inner walls 222, the depth to which the through holes of the second recesses 224 extend respectively through the left and right inner walls 222 is decreased. Thus, when the screen body 3 is in the folded state, the user can cause the second protrusions 5 to withdraw respectively from the second recesses 224 to thereby release their interference with the main device casing 23 without being required to press the second protrusions 5 too deep.

When the user intends to fold the screen body 3 once again, it is merely necessary to press the two second protrusions 5 to withdraw the two first protrusions 4 respectively from the first recesses 223 and to subsequently pivot the screen body 3 downward such that the two second protrusions 5 extend respectively into the two second recesses 224 and that the two first protrusions 4 extend respectively into the two third recesses 225. Thus, the screen body 3 can be restored to the folded state where it is accommodated in the depression 22.

In this embodiment, distal ends of the first and second protrusion 4, 5 are configured to be round-headed so that, when the second protrusions 5 are pressed and are simultaneously subjected to the pushing force applied to the front edge 321 of the screen body 3, even if the second protrusions 5 are not completely withdrawn from the second recesses 224, the round-headed distal ends can serve to guide the second protrusions 5 out of the second recesses 224. Certainly, the distal ends of the first and second protrusions 4, 5 may have other forms of guiding configurations other than the round-headed structure. In addition, parts of a bottom face of the screen casing 32 that are respectively proximate to the front edge 321 and the rear edge 322 may be configured to be curved in shape (as shown in FIGS. 6 and 7), so that the bottom face of the screen body 3 is not likely to get stuck in the depression 22 and cannot be flipped upward when the user applies a force to push the screen body 3 rearwardly.

In this embodiment, the second protrusions 5 are provided on left and right sides of the screen body 3. However, the screen body 3 may be provided with only one second protrusion 5 in other embodiments of the invention. In this case, the user only needs to press one side of the screen body 3. In addition, although the first protrusions 4 are provided to extend respectively into the third recesses 225 when the screen body 3 is in the folded state in this embodiment, the third recesses 225 may be dispensed with in practice, so that the first protrusions 4 are squeezed by the left and right inner walls 222 of the depression 22 to withdraw respectively into the left and right outer walls 31 of the screen casing 32 when the screen body 3 is in the folded state, and extend respectively into the first recesses 223 to effect the limiting function when the screen body 3 is pushed to the flipped-up state. Furthermore, in other embodiments of the invention, the first protrusions 4 may be provided respectively on the left and right inner walls 222 of the depression 22, and the first and third recesses 223, 224 maybe provided on the left and right outer walls 31 of the screen body 3.

In sum, the handheld type electronic device 200 according to the present invention utilizes the above-described structure to enable the screen body 3 to be flipped up as desired for adjusting the viewing angle of the screen body 3 to facilitate viewing by the user. In addition, through the arrangement of the first and second limiting mechanisms, the screen body 3 can be positioned when in the flipped-up state, thereby enhancing stability of the screen body 3 in the flipped-up state.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A handheld type electronic device, comprising:
   a main device body including a top face and a depression that is recessed from said top face, said depression having left and right inner walls provided with a guide slot proximate to a front thereof;
   a screen body including left and right outer walls and top and bottom faces, said screen body being provided between said left and right inner walls of said depression and being switchable between a folded state, where said screen body is accommodated in said depression and said top face is exposed from said depression, and a flipped-up state, where said screen body is flipped upward relative to said depression, said screen body further including two sliding axles provided respectively on said left and right outer walls and extending respectively into said guide slots in said left and right inner walls, said sliding axles sliding respectively along said guide slots when said screen body is switched between the folded state and the flipped-up state relative to said main device body;
   a first limiting mechanism including a pair of first protrusions that project resiliently and respectively from said left and right outer walls of said screen body, a pair of first recesses provided respectively in said left and right inner walls of said depression, and a pair of third recesses provided respectively in said left and right inner walls proximate to said guide slot, said first protrusions being disposed to extend resiliently and respectively into said first recesses such that said screen body is limited at the flipped-up state, said first recesses being spaced apart from corresponding said third recesses, and said third recesses being disposed for extension of said first protrusions thereinto, respectively, so as to limit said screen body at the folded state; and
   a second limiting mechanism including a pair of second protrusions and pair of second recess recesses corresponding to said second second protrusions, said second protrusions projecting resiliently and respectively from said left and right outer walls of said body to extend respectively into said recesses corresponding to said second protrusions, said second recesses being provided respectively in said left and right inner walls of said depression distal from said guide slot, said second protrusions being disposed to extend into said second recesses such that said screen body is limited at the folded state, said second protrusions being pressable to be withdrawn from said second recesses to enable said screen body to be flipped up relative to said depression;
   wherein said screen body further includes a plurality of resilient members and two connecting bodies, each of said connecting bodies being connected to said first protrusion and said second protrusion on a same one of said left and right outer walls of said screen body, said resilient members being provided within said screen body for enabling said first protrusions and said second protrusions to project resiliently from said left and right outer walls of said screen body.

2. The handheld type electronic device according to claim 1, wherein said main device body includes a main device casing and a plurality of electronic components disposed in said main device casing, said depression being formed in said main device casing, said second recesses extending respectively through left and right sides of said main device casing, said second protrusions being exposed from said left and right sides of said main device casing for pressing when said second protrusions extend respectively into said second recesses.

3. The handheld type electronic device according to claim 2, wherein each of said left and right inner walls is recessed to form an indentation, said second recesses being located respectively in said indentations of said left and right inner walls.

4. The handheld type electronic device according to claim 1, wherein said screen body includes a screen casing and a panel unit provided in said screen casing, said left and right outer walls of said screen body being located respectively on left and right sides of said screen casing, each of said resilient members being provided between one of left and right sides of said panel unit and a corresponding one of said left and right sides of said screen casing, each of said connecting bodies being located between one of said left and right sides of said panel unit and a corresponding one of said left and right sides of said screen casing.

5. The handheld type electronic device according to claim 1, wherein each of said first protrusions and said second protrusions has a round-headed distal end.

* * * * *